United States Patent [19]

Hyde

[11] Patent Number: 4,955,758
[45] Date of Patent: Sep. 11, 1990

[54] REINFORCING METHOD AND MEANS

[75] Inventor: Leo J. Hyde, New South Wales, Australia

[73] Assignee: Du Pont (Australia) Ltd., New South Wales, Australia

[21] Appl. No.: 79,537

[22] Filed: Jul. 30, 1987

[51] Int. Cl.⁵ .......................................... E21D 21/02
[52] U.S. Cl. .................................. 405/261; 405/259; 411/5; 411/8
[58] Field of Search ................. 405/260, 261, 259; 411/3, 4, 2, 5, 8–15

[56] References Cited

U.S. PATENT DOCUMENTS

| | | | |
|---|---|---|---|
| 3,104,645 | 9/1963 | Harrison | 411/8 X |
| 3,430,449 | 3/1969 | Novatny et al | 405/261 |
| 3,789,726 | 2/1974 | Gill et al. | 411/8 |
| 3,791,750 | 2/1974 | Cameron | 403/297 |
| 3,979,918 | 9/1976 | Vidler | 405/261 |
| 4,247,224 | 1/1981 | Killmeger | 405/260 |
| 4,289,427 | 9/1981 | Rolston | 405/260 |
| 4,369,003 | 1/1983 | Brandstetter | 405/260 |
| 4,393,638 | 7/1983 | Sell et al. | 405/261 |
| 4,479,747 | 10/1984 | Pagel | 411/8 |
| 4,564,315 | 1/1986 | Rozanc | 405/260 X |
| 4,648,753 | 3/1987 | Stephan | 405/261 X |
| 4,662,795 | 5/1987 | Clark et al. | 405/260 X |
| 4,664,573 | 5/1987 | Isley et al. | 411/5 |

FOREIGN PATENT DOCUMENTS

| | | |
|---|---|---|
| 65546 | 5/1987 | Australia . |
| 2409658 | 9/1974 | Fed. Rep. of Germany . |
| 2827314 | 1/1980 | Fed. Rep. of Germany . |
| 3145153 | 6/1983 | Fed. Rep. of Germany . |
| 3313003 | 10/1984 | Fed. Rep. of Germany . |
| 2159758 | 5/1973 | France . |
| 1228 | 7/1976 | France . |
| 162300 | 2/1986 | Japan . |
| 732541 | 5/1980 | U.S.S.R. . |
| 823592 | 4/1981 | U.S.S.R. . |
| 721811 | 4/1984 | U.S.S.R. . |
| 1119530 | 7/1968 | United Kingdom .......... 411/9 |
| 2091315 | 1/1981 | United Kingdom . |

Primary Examiner—Dennis L. Taylor
Attorney, Agent, or Firm—Charles E. Krukiel

[57] ABSTRACT

A tensionable dowel for reinforcing walls and/or roofs in excavations such as mines and tunnels is described. The dowel is particularly useful in coal mines where mine walls or roofs are subject to failure. The dowel is fabricated in fibre reinforced engineering plastic and is used with a threaded nut for tensioning the dowel in the wall or roof.

Also described is a process for manufacturing the dowel as well as a method for reinforcing walls and/or roofs by inserting the dowels therein.

9 Claims, 4 Drawing Sheets

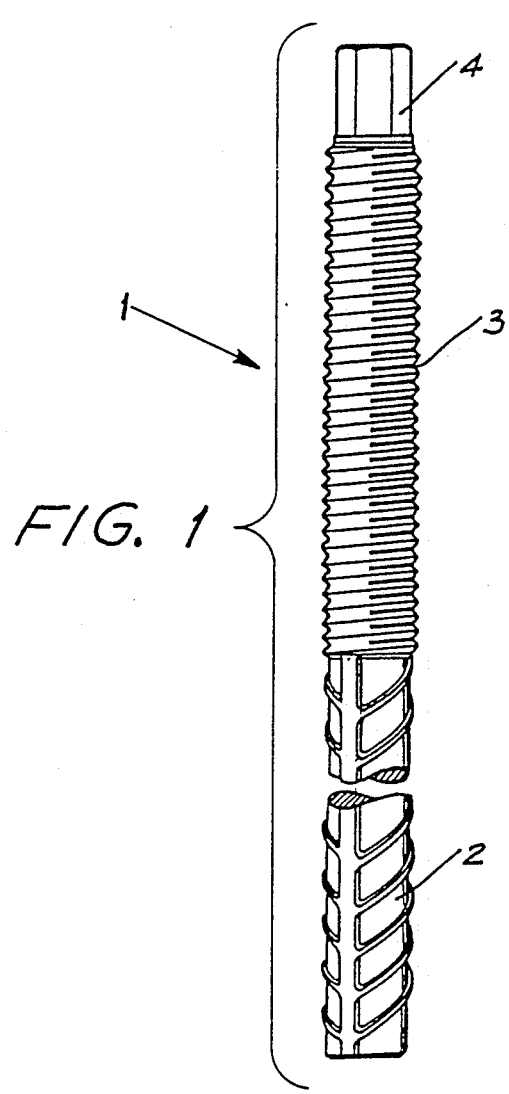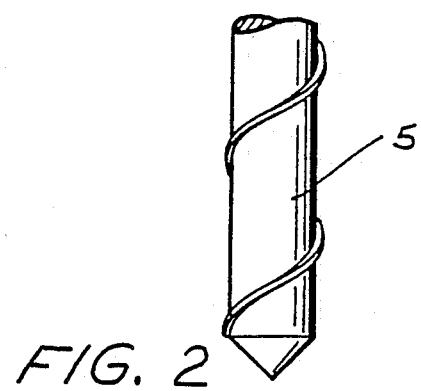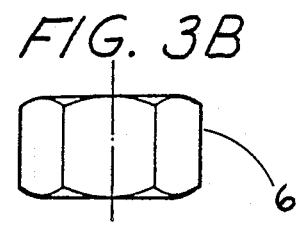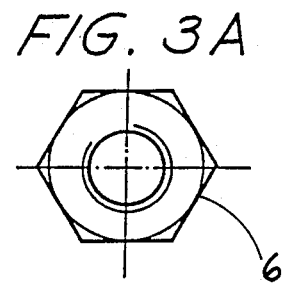

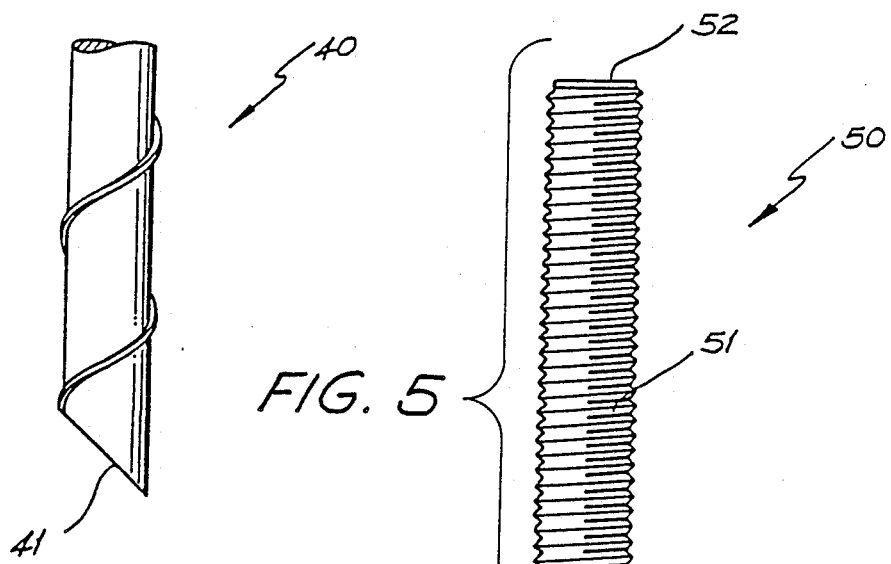
FIG. 4
FIG. 5
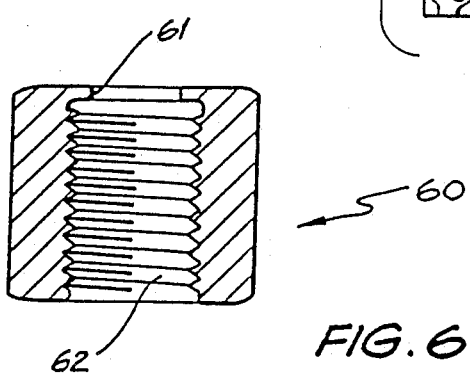
FIG. 6

REINFORCING METHOD AND MEANS

TECHNICAL FIELD

The present invention relates to tensionable dowels used for reinforcing walls and/or roofs in excavations such as tunnels and mines, e.g. coal mines where mine walls or roofs are subject to failure. The invention also concerns a method of reinforcing a wall or roof in an excavation by using the tensionable dowels and a process for producing a tensionable dowel.

BACKGROUND ART

The surfaces of walls of coal in coal mines becomes unstable through oxidation which results in spalling exposing further coal to air. In addition, pressure from strata above the mine causes such walls to slip and fail.

Walls in coal mines are usually reinforced with dowels of wood and/or fibreglass reinforced plastic held in place by resin. By contrast roofs in such mines are reinforced by tensioned steel rock-bolts. Such steel bolts are not suitable to be used in the walls of coal mines as the walls themselves being coal are eventually removed by mining machinery. Steel dowels would damage the cutting heads of the mining machines. Wood and fibreglass reinforced plastic dowels cut along with the coal without damaging the cutting heads.

Whilst it would be advantageous to tension dowels in mine walls and roofs to improve resistance of such walls and roofs to spalling, slipping and failure, it has not been practicable with the materials used for such purposes as machining fibreglass reinforced plastic dowels results in loss of strength such that threaded dowels fail at unacceptable low tensions as do machined wooden dowels. As indicated above, steel dowels would interfere with normal mining practice.

A further disadvantage of steel rock-bolts is their limited life due to their susceptibility to corrosion in the water/acid environments of excavations such as tunnels and mines.

There is a need for a tensionable dowel which can be cut by mining machinery without damaging cutting heads and which would be resistant to corrosion.

Another disadvantage of steel rock-bolts used in the roof of mines is that they are prone to failure without warning and such failure is often accompanied by collapse of the roofs which they support.

Thus a need also exists for rock-bolts and tensionable dowels which are able to indicate increasing pressures in mine strata to give early warning of a potential collapse.

OBJECTS OF INVENTION

It is therefore an object of the invention to provide a tensionable dowel for reinforcing walls and/or roofs in excavations such as tunnels and mines. It is also an object of the invention to provide such dowels with a means to indicate a build-up of pressure in walls and/or roofs of excavations such as tunnels and mines.

DISCLOSURE OF THE INVENTION

The applicants have found that a tensionable dowel of satisfactory strength can be manufactured from a fibre reinforced engineering plastic. The applicants have further found that by engaging a nut onto a threaded portion on one end of the tensionable dowel and tensioning the nut against a wall or roof in an excavation such as tunnels and mines, the hold between the nut and dowel being adapted to fail at a preselected tension, provides an indication that a selected tension has been reached in the wall or roof since the hold fails.

According to a first embodiment of the present invention there is provided a tensionable dowel for reinforcing walls and/or roofs in excavations such as tunnels and mines comprising an elongate member of fibre reinforced engineering plastic having a first end adapted to bond to an anchoring resin and a threaded portion at or adjacent the other end for engaging a nut of corresponding thread.

According to a second embodiment, there is provided the dowel of the first embodiment in combination with a nut having a thread adapted to mate with the threaded portion. Preferably the hold between the threaded portion and the nut is adapted to fail when the dowel and nut are subjected to a preselected load, to provide an indication that a tension equal to or greater than a preselected value is present in the mine or wall.

The invention also provides according to a third embodiment, a method of reinforcing a wall or roof in an excavation such as a tunnel or mine, which method comprises the steps of:

(i) placing an unset anchoring resin into a hole in the wall or roof, (ii) inserting the first end of the dowel of the first embodiment into the hole, (iii) optionally mixing the resin, (iv) allowing the unset resin to set, and (v) tensioning the dowel by threading a nut having a thread adapted to mate with the threaded portion onto the threaded portion and tightening the nut against the wall or roof or against a plate abutting the wall or roof.

According to a fourth embodiment there is provided a process of forming a tensionable dowel according to the first embodiment which process comprises injection moulding a melted engineering plastic having reinforcing fibres into an evacuated preheated die adapted to mould said dowel; and maintaining the injected engineering plastic under pressure until a portion of said engineering plastic solidifies and prevents the injected plastic from exiting from the die allowing the engineering plastic in the mould to set and form the dowel and removing the dowel from the mould.

The invention also provides a tensionable dowel prepared according to the process of the fourth embodiment.

Preferably the threaded end is adapted to enable the dowel to be turned to failitate mixing of the anchoring resin.

Alternatively the nut can be adapted to engage the dowel so that when the nut is turned the dowel turns simultaneously and thus enhances mixing of the anchoring resin. Thus the nut can have a flange for example, at the end of the internal thread, such that the nut can be threaded onto the dowel until the flange abuts the end of the dowel. At this point the nut engages the dowel and further turning turns both the nut and the dowel. With the nut in this position, the nut and thus the dowel can be turned to enhance mixing of the anchoring resin. The anchoring resin can be a combination of an epoxy resin in combination with a hardener or can be at least two component polyester resin or other like resin. When the resin sets, the dowel becomes fixed in the anchoring resin and the flange on the nut can be broken by applying further tension to the nut. Once the flange has been broken the nut can be tensioned against a wall or roof in an excavation or against a plate abutting the wall or roof.

In the tensioned position against a wall or roof a nut additionally provides a safety device since preferably the thread of the dowel is adapted so that as tension on the bolt and nut increases above a selected level the thread of the nut fails. Nut failure dissipates built up energy reducing the probability of the bolt being discharged from the wall or roof as a potentially dangerous projectile and provides an early warning of potential bolt failure. The thread of the nut can be adapted to fail by fabricating the nut from a fibre reinforced engineering plastic which is weaker than the fibre reinforced engineering plastic used to fabricate the tensionable dowel.

The fibre reinforcement may be glass, boron, carbon, silicon nitride, aramid (Kevlar—Registered Trade Mark of E. I. du Pont Nemours Co.) and metals. For reasons of cost, glass fibres are preferred. For high-strength applications other fibres may be employed. The term engineering plastic is a term of the art and is defined in Kirk-Othmer Encyclopedia of Chemical Technology, 3rd Edition Vol 9, page 118. The length of the fibres can be chosen according to the application, for example medium to high strength is required $\frac{1}{4}$" to 1" glass fibres can be used. A preferred engineering plastic is modified polyethylene terephthalate. Other suitable engineering plastics include nylon, amorphous nylon, acetals, thermoplastic polyesters, poly(phenylene oxide) based resins, polycarbonates, fluoropolymers, polyimides, acrylonitrile-butadiene-styrene terpolymers and their alloys with polycarbonates, polysulfones, polyacrylates, poly(phenylene sulfide) resins, and the like. Particularly suitable are high strength engineering plastics, especially those with high tensile and shear strengths. Tensile strengths of 150–250 MPa and shear strengths of 70–100 MPa are preferred.

It has been found that RYNITE [Registered Trade Mark of E. I. du Pont de Nemours & Co] can be advantageously used as the engineering plastic since RYNITE has good acid and base resistance at room temperature and excellent resistance to a wide variety of fluids such as hydrocarbons and organic solvents.

A high strength engineering plastic is preferably used to fabricate the dowel high strength RYNITE such as RYNITE 555 which has a tensile strength of 196 MPa and a shear strength of 82.7 MPa at 23° C. has been found to be suitable in this respect. Advantageously the nut is fabricated from a medium to low strength engineering plastic so that the thread of the nut falls at a preselected tension and thus provides an indication that a selected tension in the wall or roof of an excavation has been reached since the nut thread fails. A nut fabricated from RYNITE 530 which has a tensile strength of 158 MPa and a shear strength of 70.2 MPa at 23° C. has been found to be suitable in this respect. Alternatively the engineering plastic used to fabricate both the dowel and the nut can be identical.

It has been found that a dowel according to the first embodiment and made according to the process of the fourth embodiment can be tensioned with a nut in a mine wall to hold to a load of 5 tonne and higher.

Optionally the tensional dowel comprises a fibre reinforced engineering plastic which is additionally reinforced with Kevlar fibres. Alternatively Kevlar fibres alone can be used as the reinforcing fibre. Such reinforcement provides a higher strength dowel capable of withstanding loads of up to 12 tonnes and higher. The Kevlar fibres can be short fibres ($\frac{1}{4}$" to $\frac{1}{2}$") incorporated throughout the dowel and/or strands or ribbons of Kevlar running through the length of the dowel. By altering the length of Kevlar fibres used the strength of the dowel can be altered.

The dowels and nuts may be manufactured by conventional methods for engineering plastics such as casting, extruding or injection moulding. The particular method chosen will depend on the engineering plastic. For example RYNITE is suitable for injection moulding but not an extrusion process.

The injection moulding apparatus may be arranged so that the molten engineering plastics material feeds into a die adapted to mould the nut from the same reservoir as the die adapted to mould the dowel is supplied from and is thus formed simultaneously with the dowel. Alternatively the nut can be formed in a separate operation.

The dowels of the present invention can be cut along with coal without damaging the cutting heads of a mining machine but provide similar holding capacity of steel rock-bolts. In addition when used with the nut so chosen that the thread will fail when the dowel and nut are subjected to a preselected load, the dowels of the invention can provide an early warning of build-up of stresses within mine walls. A particular advantage of the tensionable dowels of the invention is their anticipated resistance to corrosion and degradation with the result that they should have a long life in comparison to steel dowels.

A high strength Kevlar reinforced dowel provides an alternative to steel rock bolt for mine roof applications. This usage requires a modification of the bolting pattern used so that the dowels can support the mine roof.

BRIEF DESCRIPTION OF THE DRAWINGS

A preferred embodiment of the invention is illustrated in the drawings in which:

FIG. 1 is a representation of a tensionable dowel of the invention;

FIG. 2 is a representation of an alternative profiled end of the dowel of FIG. 1;

FIGS. 3(A and B) are a representation of a nut suitable for use with the dowel of FIG. 1;

FIG. 4 shows the first end of a preferred dowel of the invention;

FIG. 5 shows a broken side view of a dowel of the invention with a modified threaded end;

FIG. 6 shows a flanged nut;

BEST MODE FOR CARRYING OUT THE INVENTION

Figure 7:
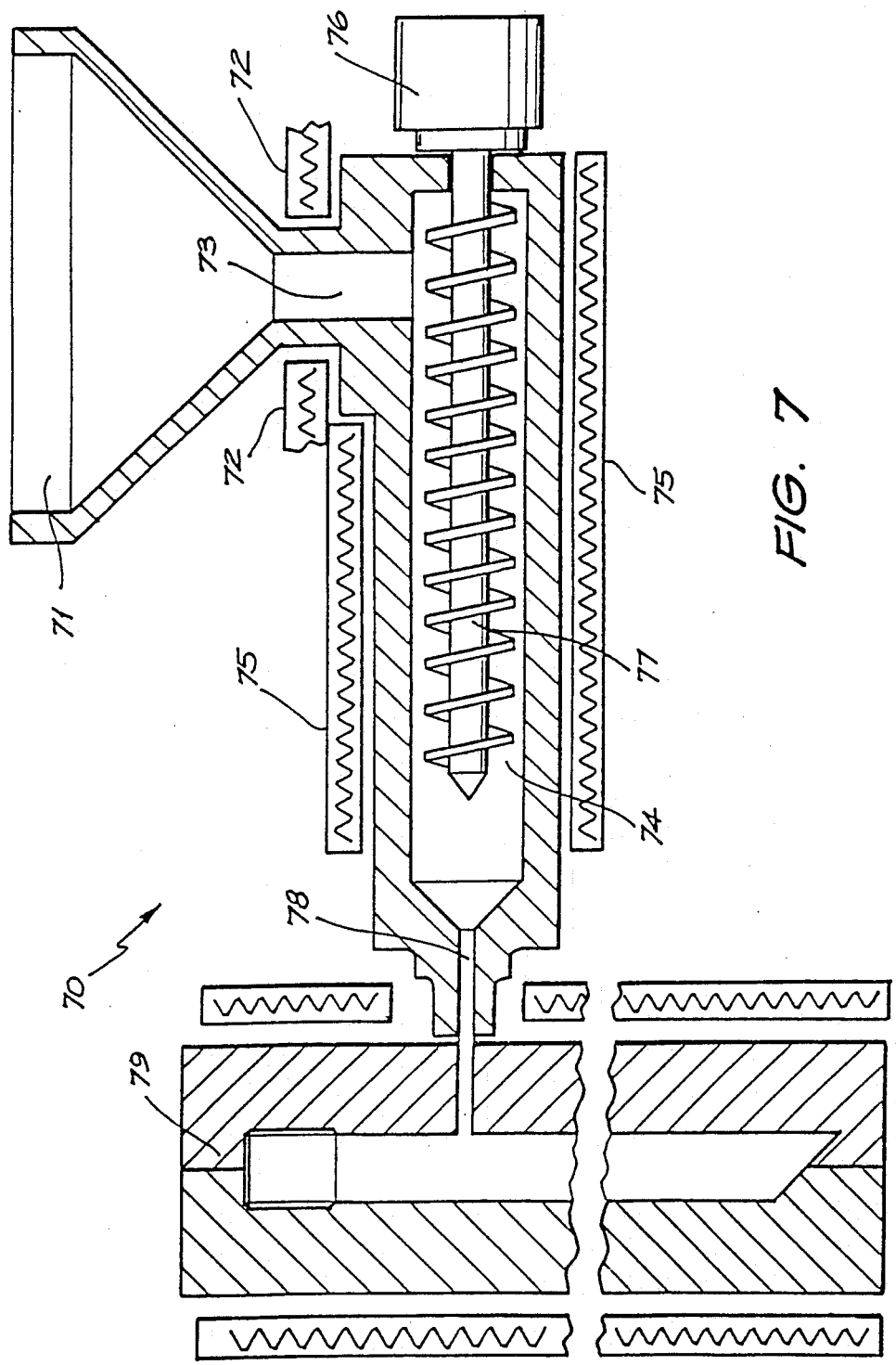
FIG. 7 shows an injection moulding apparatus for moulding a dowel according to the invention.

Referring to FIG. 1 tensionable dowel 1 for reinforcing walls and/or roofs in excavations such as mines and tunnels consists of an elongate member of glass fibre reinforced RYNITE 555 having a first end 2 and a threaded end 3.

First end 2 has a profile as for a BHP R20 reinforcing bar.

Alternatively first end 2 can have a 40 pitch profile 5 as shown in FIG. 2.

Threaded end 3 is 0.875 inch UNC-1A thread having an hexagonal end portion 4.

Referring to FIG. 3 nut 6 is fabricated from glass fibre reinforced RYNITE 530 and has a 0.875 inch UNC-1B thread to mate with threaded end 3.

In use a hole is drilled in a mine wall or roof and an unset anchoring resin and hardener are placed into the hole. First end 2 is then inserted into the hole and rotated by turning end portion 4, e.g. with an spanner to effect mixing of the resin and hardener. After the resin has set a plate having a perforation is placed against the mine wall or roof such that threaded end 3 protrudes therethrough.

Nut 6 is then screwed onto threaded end 3 and tensioned against the plate. Since nut 6 is fabricated from RYNITE 530 as opposed to RYNITE 555 for dowel 1, the thread of nut 6 fails at a preselected tension and thus provides an indication that a selected tension in the wall or roof of an excavation has been reached since the thread of nut 6 fails.

Alternatively dowel 1 is supplied with the plate and nut 6 premounted proximate end portion 4 for tensioning once the resin has set.

The dimensions of a typical dowel 1 and nut 6 of the type illustrated in FIGS. 1 to 3 are as follows:

Dowel 1 is 1.2 m in length and has a diameter of 19 mm.

Thread portion 3 is 12 cm long and has a 1 cm hexagonal end portion 4.

Nut 6 has an internal diameter of 19 mm and the external hexagonal profile has an apex to diagonal apex diameter of 4.0 cm. Nut 6 is 3.5 cm long.

EXAMPLE 1

FIG. 4 illustrates a preferred first end portion 40 of a dowel. End 41 of portion 40 is camfered so that when the dowel is turned mixing of an unset anchoring resin disposed about end 41 is enhanced.

EXAMPLE 2

FIG. 5 illustrates a broken side view of a dowel 50 having a modified thread end 51 which extends to end 52 of dowel 50. Thread end 51 is used in conjunction with a flanged nut 60 shown in FIG. 6. Nut 60 has a flange 61 at the end of thread 62.

Nut 60 is applied to threaded end 51 of dowel 50 (FIG. 5) when dowel 50 is positioned in a hole in a mine wall or roof in which anchoring resin has been placed. Nut 60 is screwed onto threaded end 51 until flange 61 abuts end 52. At this point further turning of nut 60 causes both nut 60 and dowel 50 to turn in the hole enhancing mixing of the anchoring resin. As the anchoring resin sets, dowel 50 becomes fixed in the hole and further turning of nut 60 breaks flange 61 and allows nut 60 to be tensioned against the mine wall or roof.

The following Example describes a method of forming a dowel according to the invention.

EXAMPLE 3

The injection moulding is performed in an injection moulding apparatus 70 as shown in FIG. 7. Fibre reinforced engineering plastic is placed in the reservoir 71 which is heated by heaters 72 to melt the plastic.

The melted plastic flows from inlet 73 into injection chamber 74.

Chamber 74 is heated by heaters 75 to maintain the plastic in a melted state.

Motor 76 turns screw 77 thereby forcing melted plastic into nozzle 78.

The melted plastic is forced into die 79 via nozzle 78 by the turning action of screw 77.

Once a required amount of melted plastic material has been forced into die 79 screw 77 is held in position to maintain pressure on the melted plastic until a portion solidifies in nozzle 78 preventing melted plastic from exiting from the die when screw 77 is withdrawn.

A suitable dowel can be formed by injection moulding a melted engineering plastic. In this case Rynite, reinforced with glass fibres into an evacuated die 79 preheated to a temperature greater than 100° C.

The melted Rynite is injected at a temperature above 200° C. This is sufficient to allow the plastic to be injected into the die but sufficiently low that the plastic does not degrade. Die 79 is maintained under pressure by screw 77 for a holding time typically between 40 and 100 seconds. Pressures employed are typically greater than 1000 psi to allow partial solidification of the plastic.

Die 79 can have at least one amarid ribbon disposed therein prior to injection of the Rynite so that a dowel formed in die 79 has an amarid ribbon incorporated therein disposed longitudinally along the length of the dowel.

Figure 8:
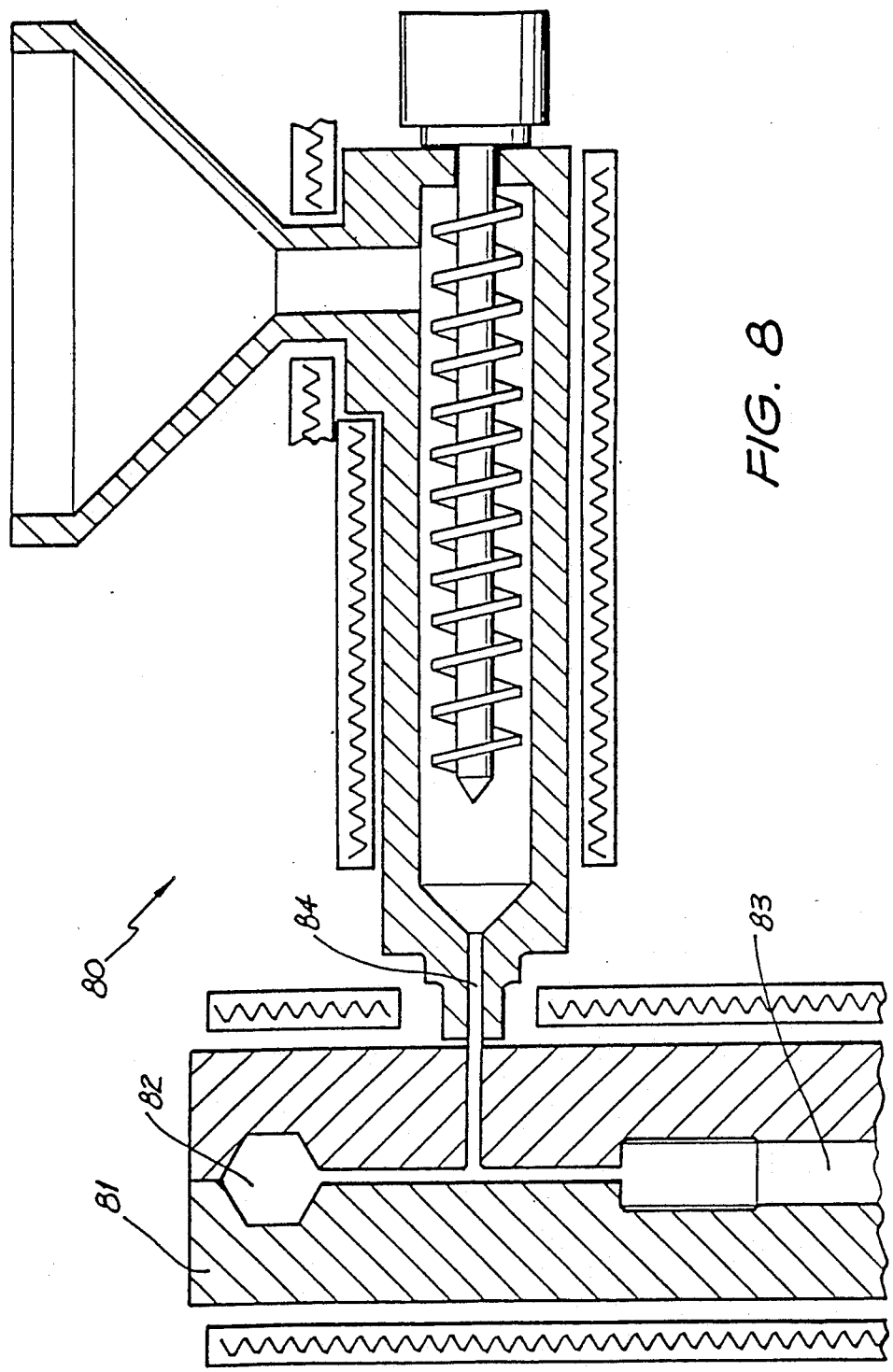
FIG. 8 shows an injection moulding apparatus for simultaneously moulding a dowel and a nut according to the invention.

FIG. 8 shows a modified injection moulding apparatus 80 wherein die 81 is divided into two chambers 82 and 83 so that when the melted plastic is forced through nozzle 84, it enters both chambers 82 and 83 to form a dowel and nut simultaneously.

I claim:

1. A tensionable dowel for reinforcing walls and/or roofs in excavations comprising an elongate member of fibre reinforced engineering plastic having a first end adapted to bond to an anchoring resin and a threaded portion at or adjacent the other end for engaging a nut of corresponding thread, the thread of the nut and the thread on the dowel having different strengths which are selected to cause the hold between said threads to fail at a preselected load to provide an indication that a tension equal to or greater than a preselected value is present in the roof or wall.

2. A dowel according to claim 1 wherein the threaded portion further includes means to enable said dowel to be turned to cause mixing of unset anchoring resin about said first end.

3. A dowel according to claim 1 including at least one ribbon or strand of fibre reinforcement incorporated therein and disposed along the length of said dowel.

4. A dowel according to claim 1 wherein said first end is shaped to enhance mixing of unset anchoring resin about said first end when said dowel is turned.

5. A dowel according to claim 1 wherein said engineering plastic is selected from the group consisting of nylon, amorphous nylon, acetals, a thermoplastic polyester including Rynite, Rynite 555 and Rynite 530, poly(phenylene oxide) based resins, polycarbonates, fluoropolymers, polyimides and acrylonitrile-butadiene-styrene terpolymers and their alloys with polycarbonates, polysulfones, polyacrylates, poly(phenylene sulfide) resins.

6. A dowel according to claim 5 wherein said engineering plastic is polyethylene terephthalate.

7. A dowel according to claim 5 wherein the tensile strength of the engineering plastic is between 150 and 250 MPa and the shear strength is between 70 and 100 MPa.

8. A dowel according to claim 1 wherein the fibre reinforcement is selected from the group consisting of glass, boron, carbon, silicon nitride, aramid and metal fibres and mixtures of two or more thereof.

9. A combination according to claim 1 wherein said nut has a flange disposed so that the nut can be threaded onto said threaded portion until the flange abuts the end of said dowel wherein further turning of said nut also causes said dowel to turn and to mix unset anchoring resin about said first end and wherein said flange is adapted to break when said nut is turned with sufficient force about a dowel anchored in a wall or roof so that said nut can be tensioned against said wall or roof or against a plate abutting said wall or roof.

* * * * *